US012553497B2

United States Patent
Sora et al.

(10) Patent No.: US 12,553,497 B2
(45) Date of Patent: Feb. 17, 2026

(54) POWER TRANSMISSION DEVICE

(71) Applicant: HONDA MOTOR CO., LTD., Tokyo (JP)

(72) Inventors: Masaru Sora, Tokyo (JP); Soichi Sugino, Saitama (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 18/796,814

(22) Filed: Aug. 7, 2024

(65) Prior Publication Data

US 2025/0052301 A1 Feb. 13, 2025

(30) Foreign Application Priority Data

Aug. 7, 2023 (JP) .................................. 2023-128790

(51) Int. Cl.
*F16H 7/06* (2006.01)
*F16H 55/30* (2006.01)

(52) U.S. Cl.
CPC .............. *F16H 7/06* (2013.01); *F16H 55/30* (2013.01)

(58) Field of Classification Search
CPC ... F16H 7/06; F16H 55/30; F16H 7/08; F16H 7/18; F16H 2007/0891; F16H 2007/185; F16H 37/082; F16H 48/40; F16H 57/037; F16H 57/082
USPC ......................................... 474/215, 213, 212
See application file for complete search history.

(56) References Cited

U.S. PATENT DOCUMENTS

| | | | | |
|---|---|---|---|---|
| 4,826,337 A * | 5/1989 | Unuma | ..................... | B41J 11/30 271/34 |
| 7,201,687 B2 * | 4/2007 | Mott | ...................... | F16G 13/04 156/215 |
| 7,329,198 B2 * | 2/2008 | Kotani | .................... | F16G 13/04 474/212 |
| 7,476,170 B2 * | 1/2009 | Ogo | ....................... | F16G 13/04 474/212 |
| 7,546,725 B2 * | 6/2009 | Shimaya | ................. | F16G 13/04 59/8 |
| 7,837,583 B2 * | 11/2010 | Tohara | .................... | F16G 13/08 474/201 |
| 7,850,565 B2 * | 12/2010 | Junig | ...................... | F16G 13/04 474/215 |
| 7,942,772 B2 * | 5/2011 | Sonoda | .................... | F16G 13/04 474/215 |

(Continued)

FOREIGN PATENT DOCUMENTS

| | | |
|---|---|---|
| JP | 2007-154913 A | 6/2007 |
| JP | 2011-236943 A | 11/2011 |
| JP | 2016-061337 A | 4/2016 |

*Primary Examiner* — Henry Y Liu

(74) *Attorney, Agent, or Firm* — Paratus Law Group, PLLC

(57) ABSTRACT

A power transmission device includes: a first rotation member; a first rotation shaft supporting the first rotation member; a second rotation member; a second rotation shaft supporting the second rotation member; and an endless flexible member wound around the first rotation member and the second rotation member, in which at least one of the first rotation member and the second rotation member is movable in an axial direction thereof, and the endless flexible member includes a restriction portion configured to restrict movement of at least one of the first rotation member and the second rotation member in the axial direction.

8 Claims, 8 Drawing Sheets

(56) References Cited

U.S. PATENT DOCUMENTS

| | | | | |
|---|---|---|---|---|
| 7,972,234 B2* | 7/2011 | Sakamoto | F16G 13/04 | 474/212 |
| 8,137,226 B2* | 3/2012 | Yoshida | F16G 13/04 | 474/213 |
| 8,337,348 B2* | 12/2012 | Kabai | F16G 13/04 | 474/215 |
| 8,454,465 B2* | 6/2013 | Bongard | F16G 13/04 | 474/212 |
| 8,550,946 B2* | 10/2013 | Ritz | F16G 13/08 | 474/213 |
| 8,657,711 B2* | 2/2014 | Hirai | F16G 13/04 | 474/214 |
| 8,672,786 B2* | 3/2014 | Young | F16G 13/04 | 474/206 |
| 8,789,892 B2* | 7/2014 | Niederriter | E21C 25/06 | 299/43 |
| 8,888,633 B2* | 11/2014 | Tohara | F16G 13/04 | 474/213 |
| 8,920,272 B2* | 12/2014 | Tokita | F16G 13/04 | 474/212 |
| 8,968,132 B2* | 3/2015 | Miyanaga | F16G 13/04 | 474/213 |
| 8,974,335 B2* | 3/2015 | Miyanaga | F16G 13/04 | 474/213 |
| 8,979,691 B2* | 3/2015 | Tokita | F16G 13/04 | 474/212 |
| 8,986,143 B2* | 3/2015 | Hamaguchi | F16H 7/06 | 474/148 |
| 8,998,758 B2* | 4/2015 | Hamaguchi | F16G 13/08 | 474/215 |
| 8,998,759 B2* | 4/2015 | Hamaguchi | F16G 13/04 | 474/215 |
| 9,017,199 B2* | 4/2015 | Miyanaga | F16G 13/04 | 474/213 |
| 10,730,545 B2* | 8/2020 | Kaneko | B62D 5/0403 | |
| 11,192,576 B2* | 12/2021 | Ushiro | B62D 5/0481 | |
| 2002/0123402 A1* | 9/2002 | Mott | F16G 13/02 | 474/212 |
| 2005/0049098 A1* | 3/2005 | Butterfield | F16G 13/04 | 474/212 |
| 2005/0130779 A1* | 6/2005 | Sudo | F01L 1/02 | 474/212 |
| 2005/0277507 A1* | 12/2005 | Ogo | F16G 13/04 | 474/212 |
| 2006/0293139 A1* | 12/2006 | Junig | F16G 13/04 | 474/215 |
| 2007/0032325 A1* | 2/2007 | Shimaya | C21D 9/0087 | 474/212 |
| 2007/0072718 A1* | 3/2007 | Kotani | F16G 13/04 | 474/212 |
| 2007/0072719 A1* | 3/2007 | Sakamoto | F16G 13/04 | 474/212 |
| 2007/0072720 A1* | 3/2007 | Nagao | F16G 13/04 | 474/212 |
| 2007/0161445 A1* | 7/2007 | Nagao | F16G 13/04 | 474/212 |
| 2007/0275804 A1* | 11/2007 | Morimoto | F16G 13/04 | 474/213 |
| 2007/0287563 A1* | 12/2007 | Butterfield | F16G 13/04 | 474/212 |
| 2008/0207368 A1* | 8/2008 | Junig | F16G 5/18 | 474/215 |
| 2008/0227575 A1* | 9/2008 | Fujiwara | F16G 13/02 | 474/212 |
| 2008/0300079 A1* | 12/2008 | Botez | F16G 13/04 | 474/213 |
| 2009/0042683 A1* | 2/2009 | Tohara | F16G 13/08 | 474/213 |
| 2009/0062051 A1* | 3/2009 | Ogo | F16H 7/06 | 474/213 |
| 2009/0082149 A1* | 3/2009 | Ispolatova | F16G 13/04 | 474/215 |
| 2009/0149288 A1* | 6/2009 | Sonoda | F16G 13/04 | 474/212 |
| 2009/0186729 A1* | 7/2009 | Tohara | F16G 13/08 | 474/213 |
| 2009/0186730 A1* | 7/2009 | Tohara | F16G 13/04 | 474/213 |
| 2009/0186731 A1* | 7/2009 | Tohara | F16G 13/08 | 474/213 |
| 2009/0186732 A1* | 7/2009 | Tohara | F16G 13/08 | 474/213 |
| 2009/0239697 A1* | 9/2009 | Sakamoto | F16G 13/04 | 474/213 |
| 2010/0004083 A1* | 1/2010 | Bongard | F16G 13/04 | 474/212 |
| 2010/0016110 A1* | 1/2010 | Yoshida | F16G 13/04 | 474/213 |
| 2010/0120568 A1* | 5/2010 | Ogo | F16G 13/04 | 474/230 |
| 2010/0210387 A1* | 8/2010 | Sakamoto | F16G 13/04 | 474/213 |
| 2010/0216580 A1* | 8/2010 | Kabai | F16G 13/18 | 474/215 |
| 2010/0216582 A1* | 8/2010 | Sakamoto | F16G 13/04 | 474/213 |
| 2010/0304910 A1* | 12/2010 | Tohara | F16G 13/04 | 474/213 |
| 2011/0183799 A1* | 7/2011 | Young | F16G 13/04 | 474/148 |
| 2011/0224041 A1* | 9/2011 | Tokita | F16G 13/04 | 474/213 |
| 2011/0230290 A1* | 9/2011 | Belmer | F16G 13/04 | 474/212 |
| 2011/0287883 A1* | 11/2011 | Ritz | F16G 13/04 | 474/213 |
| 2012/0065010 A1* | 3/2012 | Tokita | F16G 13/04 | 474/212 |
| 2012/0071287 A1* | 3/2012 | Hirai | F16G 13/04 | 474/214 |
| 2012/0104832 A1* | 5/2012 | Niederriter | E21C 29/02 | 74/89.17 |
| 2012/0165144 A1* | 6/2012 | Dogimont | F16G 13/04 | 474/212 |
| 2012/0196712 A1* | 8/2012 | Miyanaga | F16G 13/04 | 474/213 |
| 2013/0059691 A1* | 3/2013 | Miyanaga | F16G 13/04 | 474/214 |
| 2013/0116072 A1* | 5/2013 | Geary | F16F 15/08 | 474/110 |
| 2013/0165285 A1* | 6/2013 | Hamaguchi | F16G 13/04 | 474/215 |
| 2013/0203538 A1* | 8/2013 | Miyanaga | F16G 13/04 | 474/213 |
| 2013/0203539 A1* | 8/2013 | Kirchner | F16G 13/04 | 474/228 |
| 2013/0244821 A1* | 9/2013 | Hamaguchi | F16G 13/08 | 474/148 |
| 2013/0260934 A1* | 10/2013 | Hamaguchi | F16G 13/04 | 474/215 |
| 2013/0267364 A1* | 10/2013 | Motoshima | F16G 13/04 | 474/213 |
| 2014/0045632 A1* | 2/2014 | Sasaki | F16G 13/08 | 474/212 |
| 2014/0200106 A1* | 7/2014 | Young | F16H 55/30 | 474/148 |
| 2015/0008720 A1* | 1/2015 | Niederriter | E21C 29/02 | 74/89.17 |
| 2015/0141183 A1* | 5/2015 | Cowen | F16H 7/06 | 474/152 |
| 2015/0152943 A1* | 6/2015 | Ishida | F16G 13/08 | 474/212 |
| 2015/0240914 A1* | 8/2015 | Kurono | F16G 13/04 | 474/230 |
| 2015/0308541 A1* | 10/2015 | Botez | F16H 7/06 | 474/212 |

(56) References Cited

U.S. PATENT DOCUMENTS

2017/0349205 A1* 12/2017 Kaneko ................ B62D 5/0424
2020/0070872 A1* 3/2020 Ushiro .................... B62D 5/04
2024/0367710 A1* 11/2024 Shin ..................... B62D 5/0442

* cited by examiner

POWER TRANSMISSION DEVICE

CROSS-REFERENCE TO RELATED APPLICATIONS

This application is based on and claims priority under 35 USC 119 from Japanese Patent Application No. 2023-128790 filed on Aug. 7, 2023, the entire content of which is incorporated herein by reference.

TECHNICAL FIELD

The present invention relates to a power transmission device.

BACKGROUND ART

In related art, there has been known a power transmission device in which an endless flexible member such as a chain or a belt is wound around a drive sprocket and a driven sprocket, and power is transmitted via the endless flexible member (for example, JP2007-154913A, JP2011-236943A, and JP2016-61337A).

In such a power transmission device, generally, the drive sprocket and the driven sprocket are positioned with high accuracy in an axial direction, and a variation in the axial direction is within a width of the endless flexible member.

However, in order to position the drive sprocket and the driven sprocket in the axial direction with high accuracy, it is necessary to form a component for supporting the drive sprocket and the driven sprocket with high accuracy, which causes an increase in a manufacturing cost.

An object of the present invention is to provide a power transmission device that can reduce a manufacturing cost.

SUMMARY OF INVENTION

According to an aspect of the present invention, there is provided a power transmission device including:
a first rotation member;
a first rotation shaft supporting the first rotation member;
a second rotation member;
a second rotation shaft supporting the second rotation member; and
an endless flexible member wound around the first rotation member and the second rotation member, in which
at least one of the first rotation member and the second rotation member is movable in an axial direction thereof, and
the endless flexible member includes a restriction portion configured to restrict movement of at least one of the first rotation member and the second rotation member in the axial direction.

DESCRIPTION OF EMBODIMENTS

Figure 1:
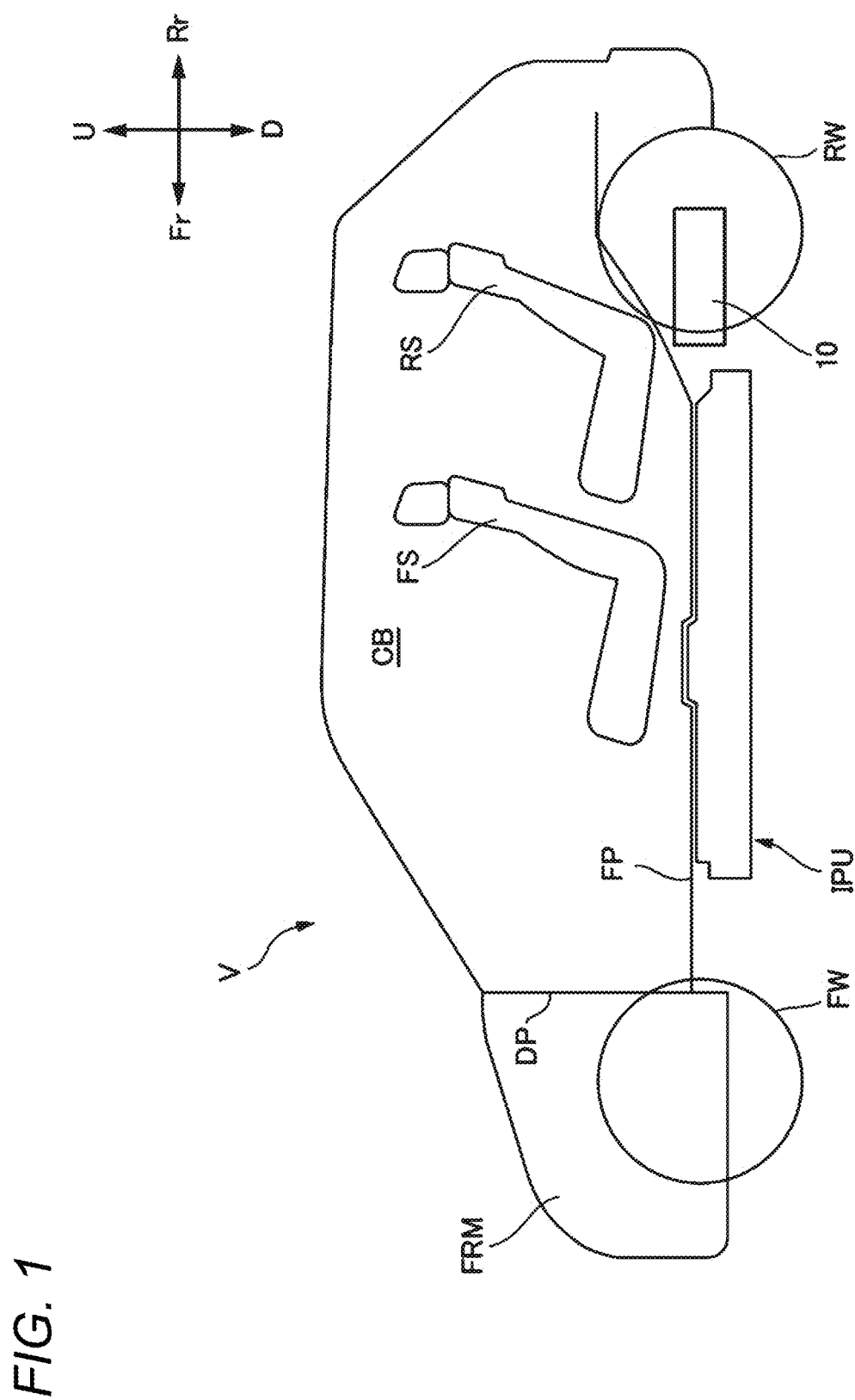
FIG. 1 is a schematic view of a vehicle on which a drive unit 10 according to an embodiment of the present invention is mounted as viewed from a left side.

Hereinafter, a vehicle on which a drive unit according to an embodiment of the present invention will be described with reference to the accompanying drawings. The drawings are viewed in directions of reference numerals. In the present specification and the like, in order to simplify and clarify the description, a front-rear direction, a left-right direction, and an upper-lower direction are described according to directions viewed from a driver of the vehicle, and in the drawings, a front side of the vehicle is shown as Fr, a rear side is shown as Rr, a left side is shown as L, a right side is shown as R, an upper side is shown as U, and a lower side is shown as D.

[Overall Configuration of Vehicle]

As shown in FIG. 1, a vehicle V according to the present embodiment includes a pair of left and right front wheels FW, a pair of left and right rear wheels RW, and a floor panel FP constituting a floor of the vehicle V. The vehicle V is partitioned, by a dash panel DP extending in the upper-lower direction above the floor panel FP, into a passenger compartment CB and a front room FRM in front of the passenger compartment CB. A front seat FS and a rear seat RS are provided in the passenger compartment CB.

The vehicle V includes a drive unit 10 serving as a drive source, and a battery pack IPU that stores electric power to be supplied to the drive unit 10.

The drive unit 10 is disposed behind the rear seat RS and below the floor panel FP. The battery pack IPU is disposed below the floor panel FP and below a floor of the passenger compartment CB. The battery pack IPU accommodates a plurality of battery modules in which a plurality of battery cells are stacked. Each battery cell is a secondary battery that can be charged and discharged, such as a lithium ion battery or an all-solid-state battery.

[Overall Configuration of Drive Unit]

Figure 2:
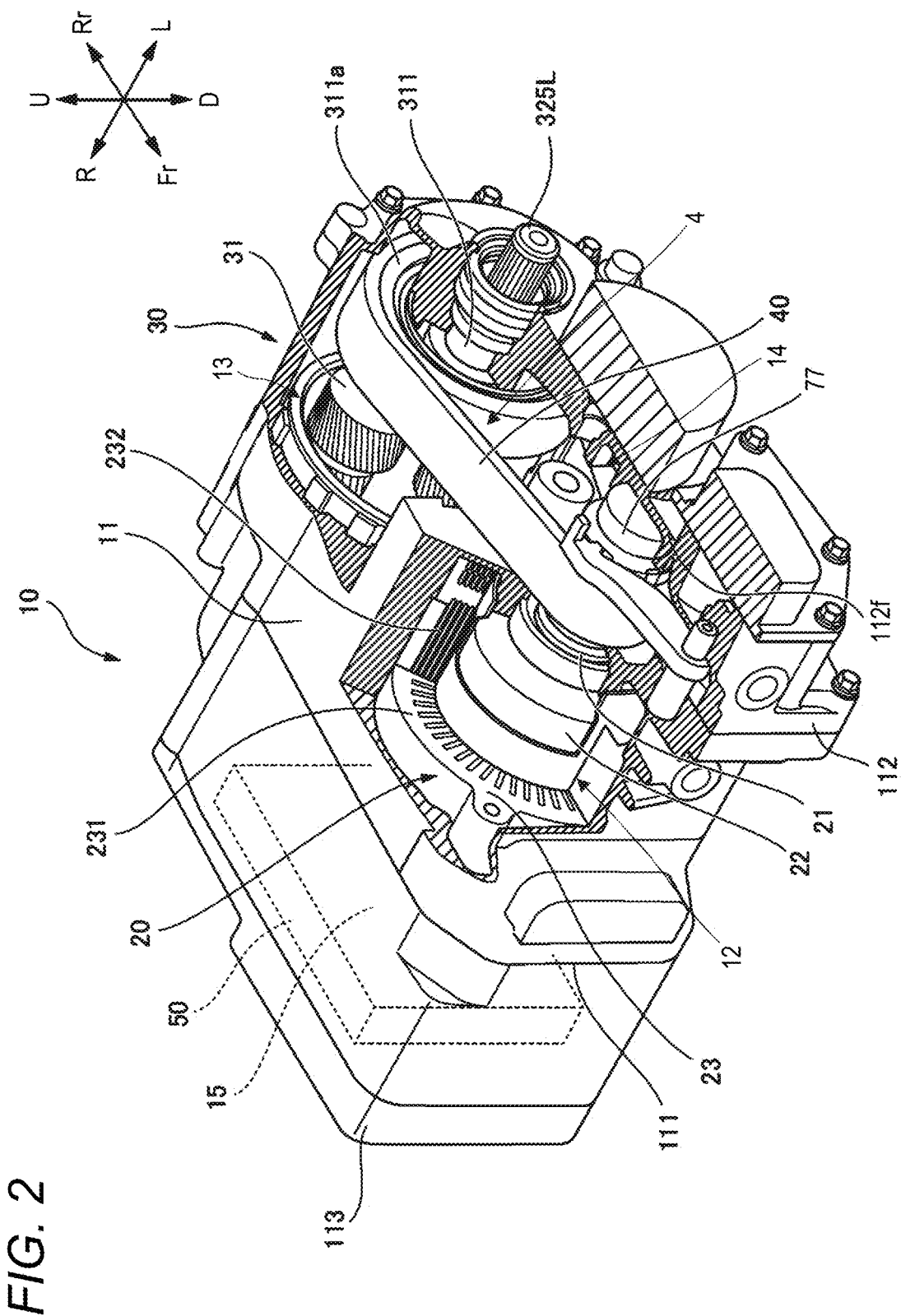
FIG. 2 is a cutaway perspective view of a part of the drive unit 10 of the embodiment of the present invention.
Figure 3:
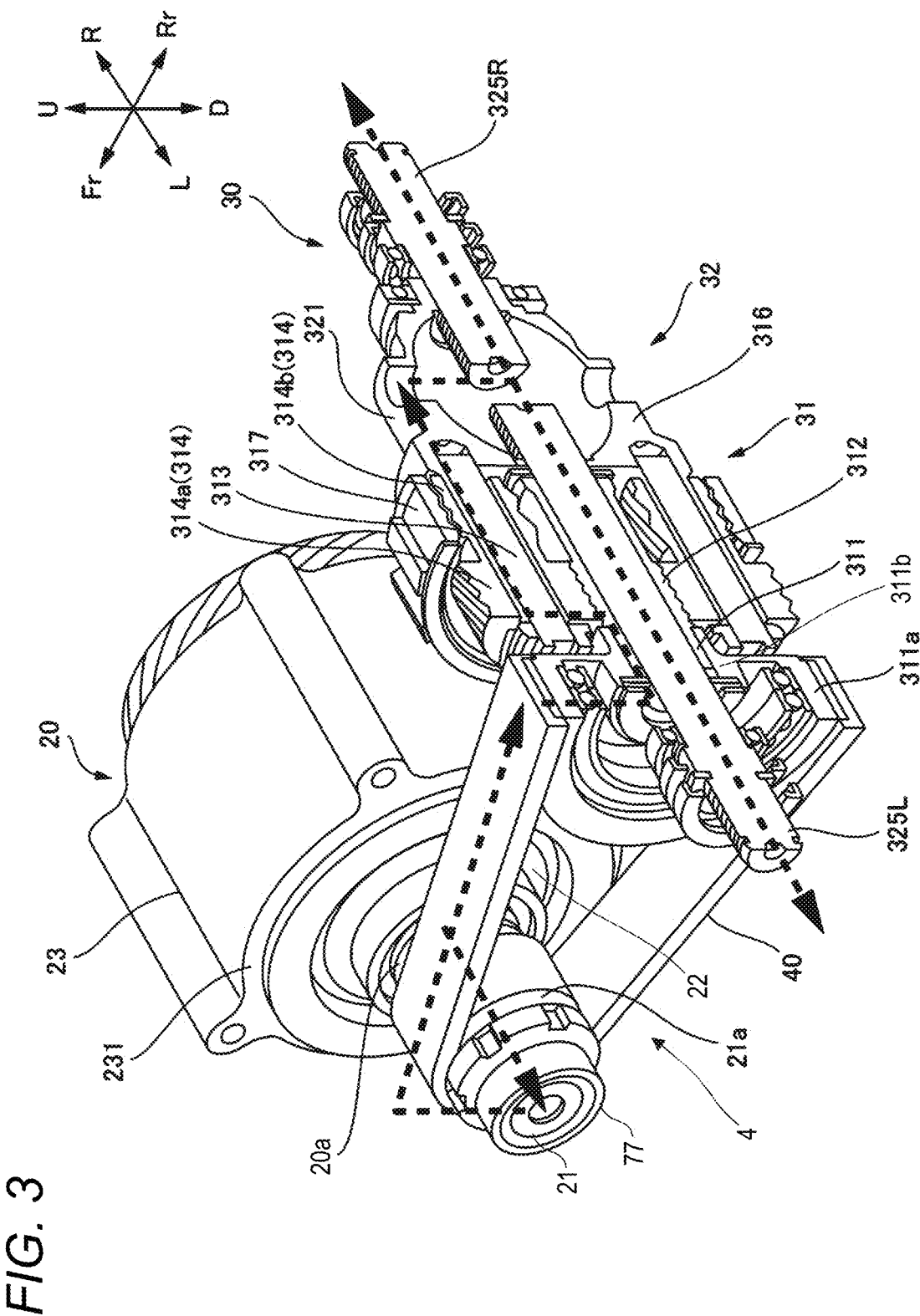
FIG. 3 is a partial cross-sectional perspective view showing a power transmission path in the drive unit 10 in FIG. 2.

As shown in FIGS. 2 and 3, the drive unit 10 includes a drive motor 20, a deceleration device 30 that reduces power output from the drive motor 20 and outputs the reduced power to the outside, a chain transmission mechanism 4 that transmits the power output from the drive motor 20 to the deceleration device 30, a control device 50 that controls the drive motor 20, and a drive unit case 11 that accommodates the above-described components.

The drive unit case 11 includes a main case 111, a left side cover 112 covering a left side surface of the main case 111, and a right side cover 113 covering a right side surface of the main case 111.

The drive unit case 11 includes a motor chamber 12 that accommodates the drive motor 20, a gear chamber 13 that accommodates the deceleration device 30, a chain chamber 14 that accommodates the chain transmission mechanism 4, and a controller chamber 15 that accommodates the control device 50. The motor chamber 12 and the gear chamber 13 are formed side by side in the front-rear direction such that the motor chamber 12 is located on the front side and the gear chamber 13 is located on the rear side. The chain chamber 14 is formed on the left side of the motor chamber 12 and the gear chamber 13 and is formed by the main case 111 and the left side cover 112. The controller chamber 15 is formed on the right side of the motor chamber 12 and the gear chamber 13 and is formed by the main case 111 and the right side cover 113.

The drive motor 20 is a so-called inner rotor motor that includes a motor shaft 20a, a rotor 22 that is attached to the motor shaft 20a and rotates integrally with the motor shaft 20a, and a stator 23 that is disposed on a radial direction outer side of the rotor 22 in a manner of facing the rotor 22 in the radial direction with a slight gap therebetween.

In the present embodiment, in the drive unit 10, the drive motor 20 is disposed such that an axial direction (that is, the motor shaft 20a) is horizontally oriented in the left-right direction. In this way, since the motor shaft 20a is oriented in the horizontal direction, an upper-lower dimension of the drive unit 10 can be compact. In the following description, an extension direction of the motor shaft 20a is referred to as an axial direction.

The stator 23 includes a stator core 231 and a coil 232 that is attached to the stator core 231 and includes a plurality of windings of a U-phase, a V-phase, and a W-phase.

Figure 5:
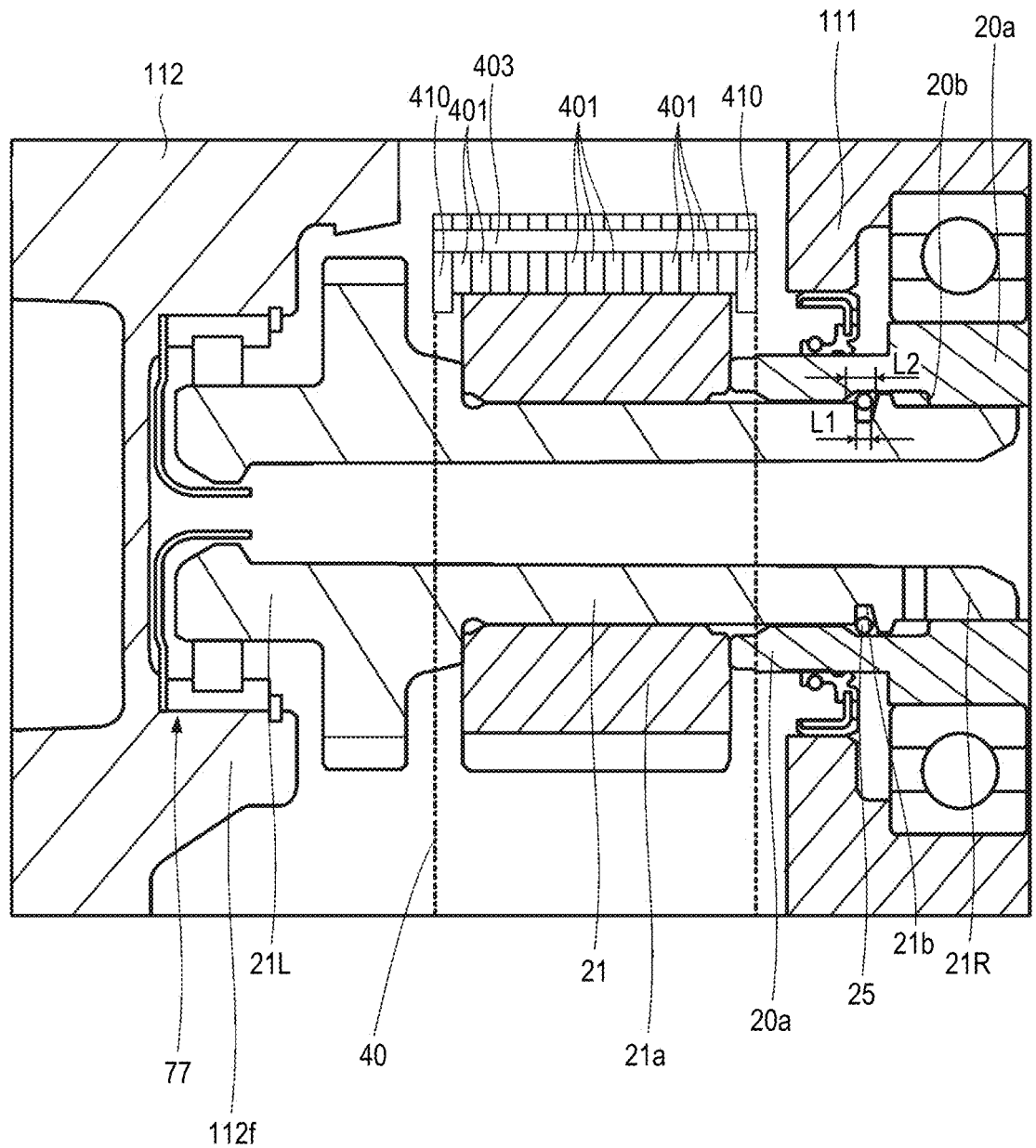
FIG. 5 is a cross-sectional view showing a support structure of a drive shaft 21.

A drive shaft 21 is coupled to the motor shaft 20a. The drive shaft 21 is coupled to the motor shaft 20a in a manner that does not allow relative rotation and allows relative movement in the axial direction. More specifically, as shown in FIG. 5, a clip 25 (for example, a C-shaped clip) is fitted into a clip groove 21b in a manner that does not allow relative movement on an outer peripheral surface of one end 21R (a right end in the present embodiment) of the drive shaft 21 inserted through an inner peripheral portion of the motor shaft 20a. Meanwhile, a sliding groove 20b in which the clip 25 fixed to the drive shaft 21 is slidable is provided in the inner peripheral portion of the motor shaft 20a. Here, a width L2 of a slidable area defined by the drive shaft 21 and the sliding groove 20b of the motor shaft 20a is larger than a width L1 of the clip 25.

The other end 21L (a left end in the embodiment) of the drive shaft 21 is rotatably supported by a cylindrical roller bearing (roller bearing) 77 provided on an inner peripheral surface of a front boss portion 112f (see FIG. 2) of the left side cover 112. The cylindrical roller bearing 77 has a small supporting force against an axial load (a load in the axial direction) as compared to a ball bearing or a tapered roller bearing. Therefore, the drive shaft 21 is allowed to move in the axial direction with respect to the motor shaft 20a and the left side cover 112 within a range of the width L2 in the slidable area. Since the drive shaft 21 rotates integrally with the motor shaft 20a, the drive shaft 21 may be referred to as the drive shaft 21 of the drive motor 20 in the following description.

At a left end of the drive shaft 21, a drive sprocket 21a around which a power transmission chain 40 of the chain transmission mechanism 4 is wound is fixed to the drive shaft 21 in a manner that does not allow relative rotation and does not allow relative movement in the axial direction. That is, the drive sprocket 21a is movable in the axial direction with respect to the motor shaft 20a and the drive unit case 11, and rotates integrally with the drive shaft 21.

The chain transmission mechanism 4 includes the drive sprocket 21a attached to the drive shaft 21, a driven sprocket 311a attached to an input shaft 311 of a planetary gear mechanism 31 to be described later on the same plane as the drive sprocket 21a, and the power transmission chain 40 wound around the drive sprocket 21a and the driven sprocket 311a. The driven sprocket 311a has a larger diameter than the drive sprocket 21a, and the number of teeth of the driven sprocket 311a is larger than the number of teeth of the drive sprocket 21a.

Figure 4:
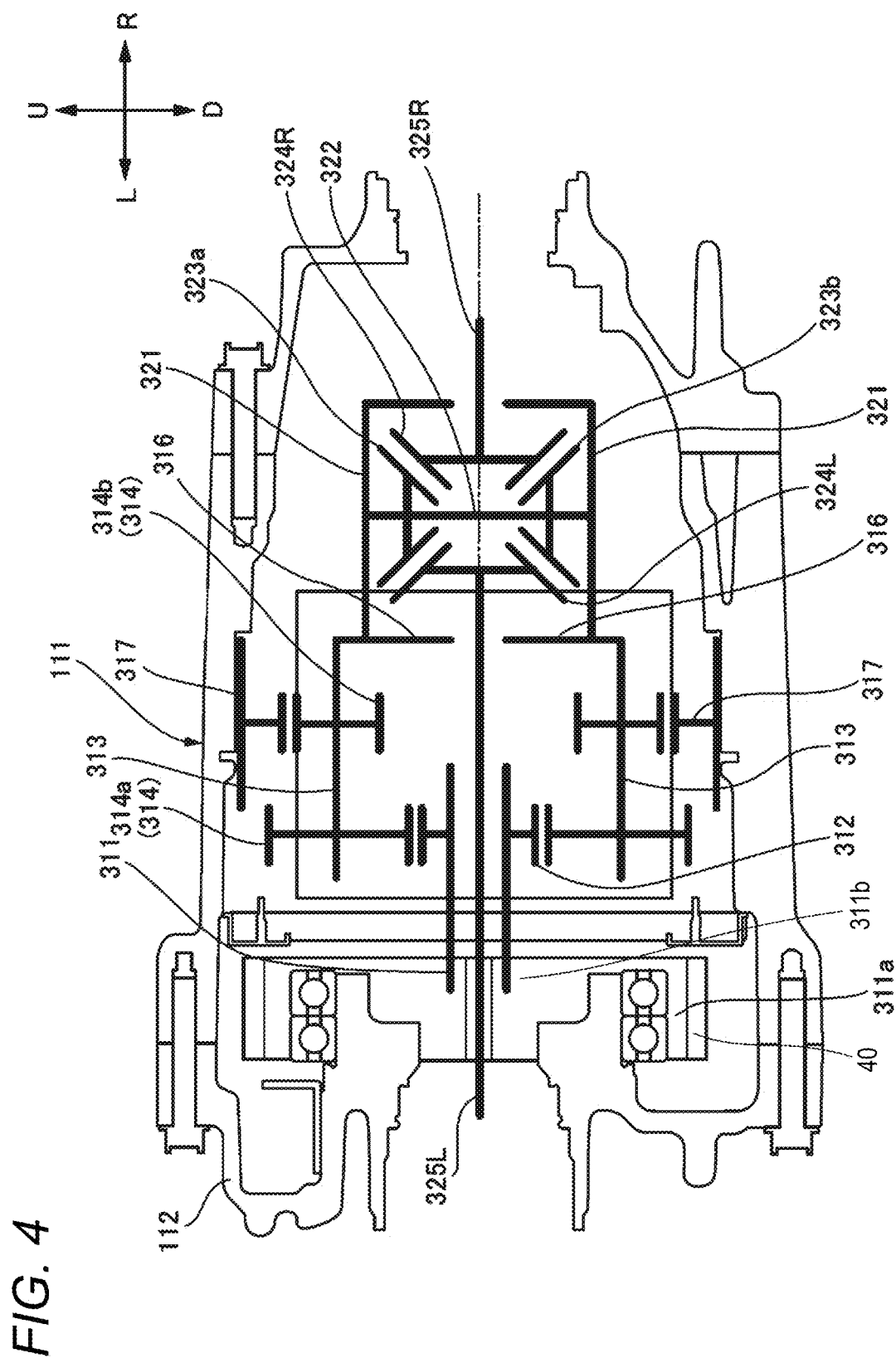
FIG. 4 is a skeleton diagram of a deceleration device in the drive unit 10 in FIG. 2.

As shown in FIGS. 3 and 4, the deceleration device 30 includes the planetary gear mechanism 31 and a differential gear mechanism 32.

The planetary gear mechanism 31 includes the input shaft 311, a sun gear 312, a plurality of planetary pinion shafts 313, the same number of stepped pinions 314 as the planetary pinion shafts 313, a planetary carrier 316, and a ring gear 317.

In the present embodiment, the planetary gear mechanism 31 is aligned behind the drive motor 20 in the front-rear direction. The planetary gear mechanism 31 is disposed such that an axial direction (that is, the input shaft 311) is parallel to the axial direction of the drive motor 20 and is oriented in the left-right direction. The input shaft 311 of the planetary gear mechanism 31 is disposed at substantially the same height as the drive shaft 21 of the drive motor 20 in the upper-lower direction. Further, an outer diameter dimension of the planetary gear mechanism 31 is substantially the same dimension as an outer diameter dimension of the drive motor 20, and a height of the drive unit 10 is small in the upper-lower direction.

The input shaft 311 is a hollow shaft into which a left drive shaft 325L to be described later is inserted. A rotation shaft 311b of the driven sprocket 311a around which the power transmission chain 40 of the chain transmission mechanism 4 is wound is fixed to a left end of the input shaft 311 in a manner that does not allow relative rotation and does not allow relative movement in the axial direction. The driven sprocket 311a is fixed to the rotation shaft 311b in a manner that does not allow relative rotation and does not allow relative movement in the axial direction. That is, the driven sprocket 311a is not movable in the axial direction with respect to the input shaft 311 and the drive unit case 11, and rotates integrally with the input shaft 311. In the present embodiment, the driven sprocket 311a and the rotation shaft 311b are integrally formed, but the configuration is not limited thereto, and the driven sprocket 311a may be formed separately from the rotation shaft 311b as long as the driven sprocket 311a is fixed to the rotation shaft 311b in a manner that does not allow relative rotation and does not allow relative movement in the axial direction.

The sun gear 312 is an external gear provided on the input shaft 311, and rotates integrally with the input shaft 311 about the same rotation axis.

The plurality of planetary pinion shafts 313 are disposed at equal intervals in a circumferential direction along an outer peripheral surface of the sun gear 312 in a manner of being oriented in the left-right direction parallel to the input shaft 311 on a radial direction outer side of the sun gear 312.

The stepped pinion 314 including a first planetary gear 314a and a second planetary gear 314b that rotate integrally is pivotally supported by each planetary pinion shaft 313 in a freely rotatable manner.

The first planetary gear 314a is an external gear that is disposed on the outer peripheral surface of the sun gear 312 and meshes with the sun gear 312.

The second planetary gear 314b is an external gear that is disposed on an inner peripheral surface of the ring gear 317 and meshes with the ring gear 317.

The planetary carrier 316 connects the planetary pinion shafts 313. The planetary carrier 316 is rotatable about a rotation axis coaxial with the input shaft 311 (and the sun gear 312) integrally with the planetary pinion shafts 313.

Therefore, the stepped pinion 314 including the first planetary gear 314a and the second planetary gear 314b is freely rotatable about the planetary pinion shaft 313 as an axis, and is freely revolvable about the rotation axis coaxial with the input shaft 311 (and the sun gear 312) integrally with the planetary pinion shaft 313. The planetary carrier 316 rotates integrally with a revolutionary motion of the stepped pinion 314 on the rotation axis coaxial with the input shaft 311 (and the sun gear 312).

The ring gear 317 is an annular internal gear whose inner peripheral surface meshes with each second planetary gear 314b. In the present embodiment, the ring gear 317 is fixed to the drive unit case 11, and the ring gear 317 does not rotate.

The differential gear mechanism 32 includes a differential case 321, a differential pinion shaft 322 supported by the differential case 321, a first bevel gear 323a and a second bevel gear 323b pivotally supported by the differential pinion shaft 322 in a freely pivotable manner, a left side gear 324L and a right side gear 324R meshing with the first bevel gear 323a and the second bevel gear 323b, and the left drive shaft 325L and a right drive shaft 325R.

The differential case 321 is formed integrally with the planetary carrier 316 of the planetary gear mechanism 31. Therefore, the differential case 321 rotates about the rotation axis coaxial with the input shaft 311 integrally with the planetary carrier 316 of the planetary gear mechanism 31.

Next, a power transmission path of power output from the drive motor 20 will be described.

The power generated by the drive motor 20 is output from the motor shaft 20a, and the drive shaft 21 and the drive sprocket 21a attached to the drive shaft 21 rotate integrally with the motor shaft 20a. When the drive sprocket 21a rotates, the driven sprocket 311a rotates due to the power transmission chain 40 wound around the drive sprocket 21a and the driven sprocket 311a attached to the input shaft 311 of the planetary gear mechanism 31. The input shaft 311 of the planetary gear mechanism 31 rotates integrally with the driven sprocket 311a. At this time, since the number of teeth of the driven sprocket 311a is larger than the number of teeth of the drive sprocket 21a, the rotation of the drive shaft 21 is reduced via the drive sprocket 21a, the power transmission chain 40, and the driven sprocket 311a, and is input to the input shaft 311 of the planetary gear mechanism 31 via the rotation shaft 311b.

In the planetary gear mechanism 31, the power input to the input shaft 311 is transmitted to the stepped pinion 314 via the sun gear 312. The stepped pinion 314 rotates while revolving. The planetary carrier 316 rotates integrally with the revolution of the stepped pinion 314. In the planetary gear mechanism 31, since the ring gear 317 is fixed, the rotation of the input shaft 311 is reduced at a predetermined reduction ratio and transmitted to the planetary carrier 316.

In the differential gear mechanism 32, the differential case 321 is formed integrally with the planetary carrier 316 of the planetary gear mechanism 31, and thus rotates integrally with the rotation of the planetary carrier 316. Therefore, the power input to the input shaft 311 of the planetary gear mechanism 31 is reduced at the predetermined reduction ratio and input to the differential case 321 via the planetary carrier 316.

Therefore, the power output from the drive shaft 21 is input to the differential case 321 of the differential gear mechanism 32 via the power transmission chain 40 and the planetary gear mechanism 31, and the differential pinion shaft 322 revolves about the rotation axis of the differential case 321 together with the differential case 321.

When the vehicle V travels straight, there is no rotation difference between the left and right rear wheels RW, and thus the left side gear 324L and the right side gear 324R that mesh with the first bevel gear 323a and the second bevel gear 323b rotate according to rotation of the differential pinion shaft 322. The left rear wheel RW rotates when the left drive shaft 325L rotates integrally with the rotation of the left side gear 324L, and the right rear wheel RW rotates when the right drive shaft 325R rotates integrally with the rotation of the right side gear 324R.

When the vehicle V turns, the differential pinion shaft 322 revolves, the first bevel gear 323a and the second bevel gear 323b rotate such that a rotation speed of the rear wheel RW on an inner side during turning decreases whereas a rotation speed of the rear wheel RW on an outer side during turning increases, and meanwhile, the left side gear 324L and the right side gear 324R that mesh with the first bevel gear 323a and the second bevel gear 323b rotate at different rotation speeds such that the rotation speed of the rear wheel RW on the inner side during turning decreases whereas the rotation speed of the rear wheel RW on the outer side during turning increases. The left rear wheel RW rotates when the left drive shaft 325L rotates integrally with the rotation of the left side gear 324L, and the right rear wheel RW rotates when the right drive shaft 325R rotates integrally with the rotation of the right side gear 324R. Therefore, when the vehicle V turns, the left drive shaft 325L and the right drive shaft 325R rotate such that the rotation speed of the rear wheel RW on the inner side during turning decreases whereas the rotation speed of the rear wheel RW on the outer side during turning increases.

In this way, as indicated by arrows in FIG. 3, the power output from the drive motor 20 is reduced via the drive sprocket 21a, the driven sprocket 311a, and the power transmission chain 40, then is input to the deceleration device 30, is further reduced by the planetary gear mechanism 31, and the power is appropriately distributed and transmitted to the left and right rear wheels RW by the differential gear mechanism 32.

Figure 6:
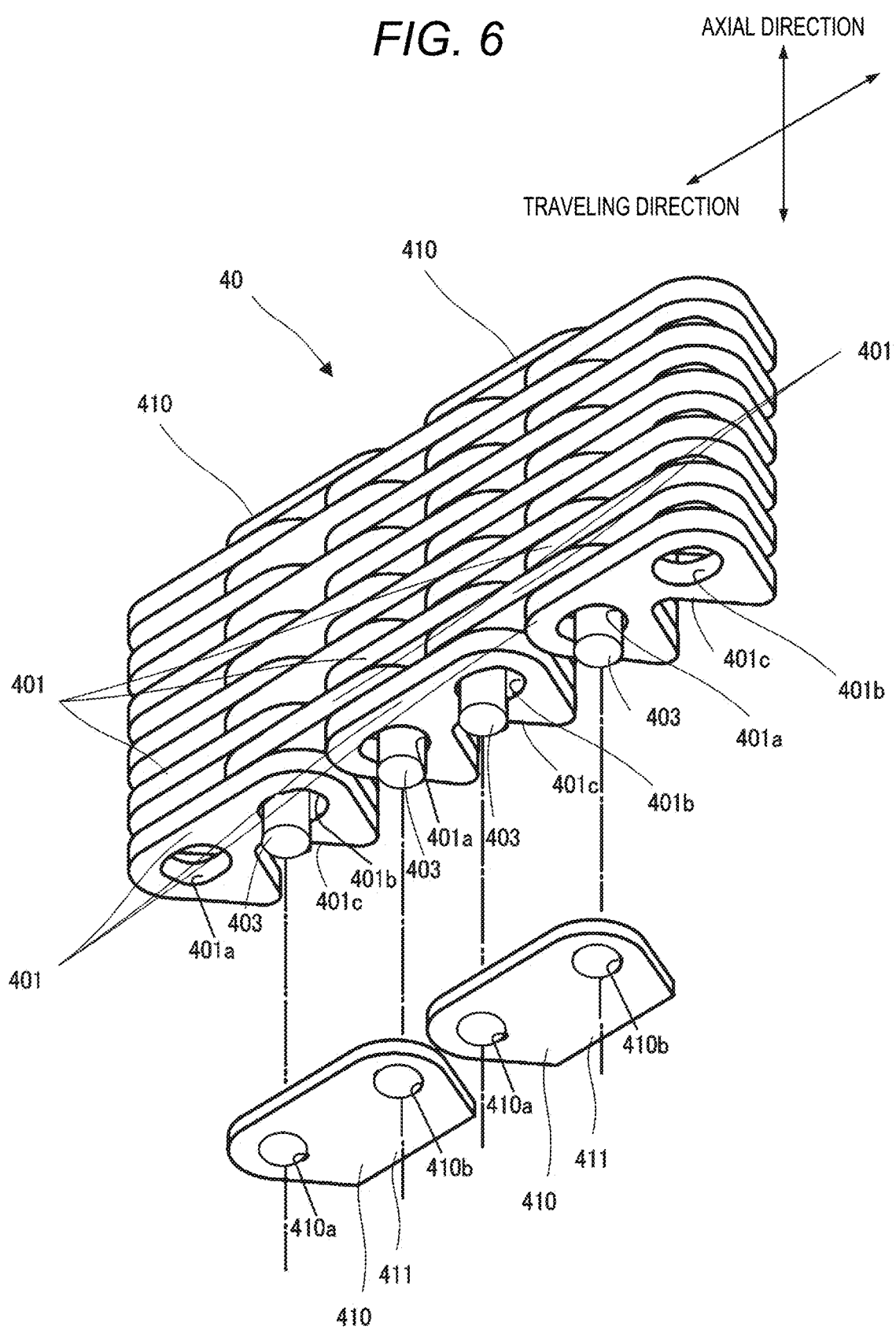
FIG. 6 is an exploded perspective view of a part of a power transmission chain 40.

Next, a structure of the power transmission chain 40 will be described with reference to FIGS. 6 and 7.

In the power transmission chain 40, a plurality of ring plates 401 disposed annularly in a traveling direction are disposed in a plurality of rows in the axial direction, and the ring plates 401 disposed annularly in the plurality of rows are connected by pins 403 penetrating the ring plates 401 in the axial direction. More specifically, in each of the ring plates 401, two through holes 401a and 401b penetrating the ring plate 401 in the axial direction are formed in a manner of being aligned in the traveling direction, and the pin 403 penetrates through different through holes 401a and 401b of adjacent rows of the ring plates 401 in the axial direction. That is, when focusing on one pin 403, the pin 403 alternately penetrates the through hole 401a of the ring plate 401 and the through hole 401b of the ring plate 401 along the axial direction. The pins 403 are disposed in all the through holes 401a and 401b.

Accordingly, the ring plates 401 disposed annularly in the plurality of rows are connected in both the axial direction and the traveling direction to form an endless annular shape. Groove portions 401c that mesh with tooth portions of the sprockets 21a and 311a are formed between the through holes 401a and 401b in each ring plate 401. Accordingly, rotation of the drive sprocket 21a is transmitted to the driven sprocket 311a via the power transmission chain 40.

The pin 403 protrudes, to both sides in the axial direction, from the ring plate 401 on one end side and the ring plate 401 on the other end side in the axial direction.

A pair of left and right guide plates 410 are disposed further outside the ring plate 401 on the one end side and the ring plate 401 on the other end side in the axial direction.

The guide plates 410 are formed such that the through holes 410a and 410b are aligned in the traveling direction, and protruding portions of the pins 403 are press-fitted therein.

Each guide plate 410 includes a guide portion 411 that overlaps the tooth portions of the sprockets 21a and 311a when viewed in the axial direction. That is, the groove portion 401c of the ring plate 401 is not formed in the guide plate 410.

Figure 7:
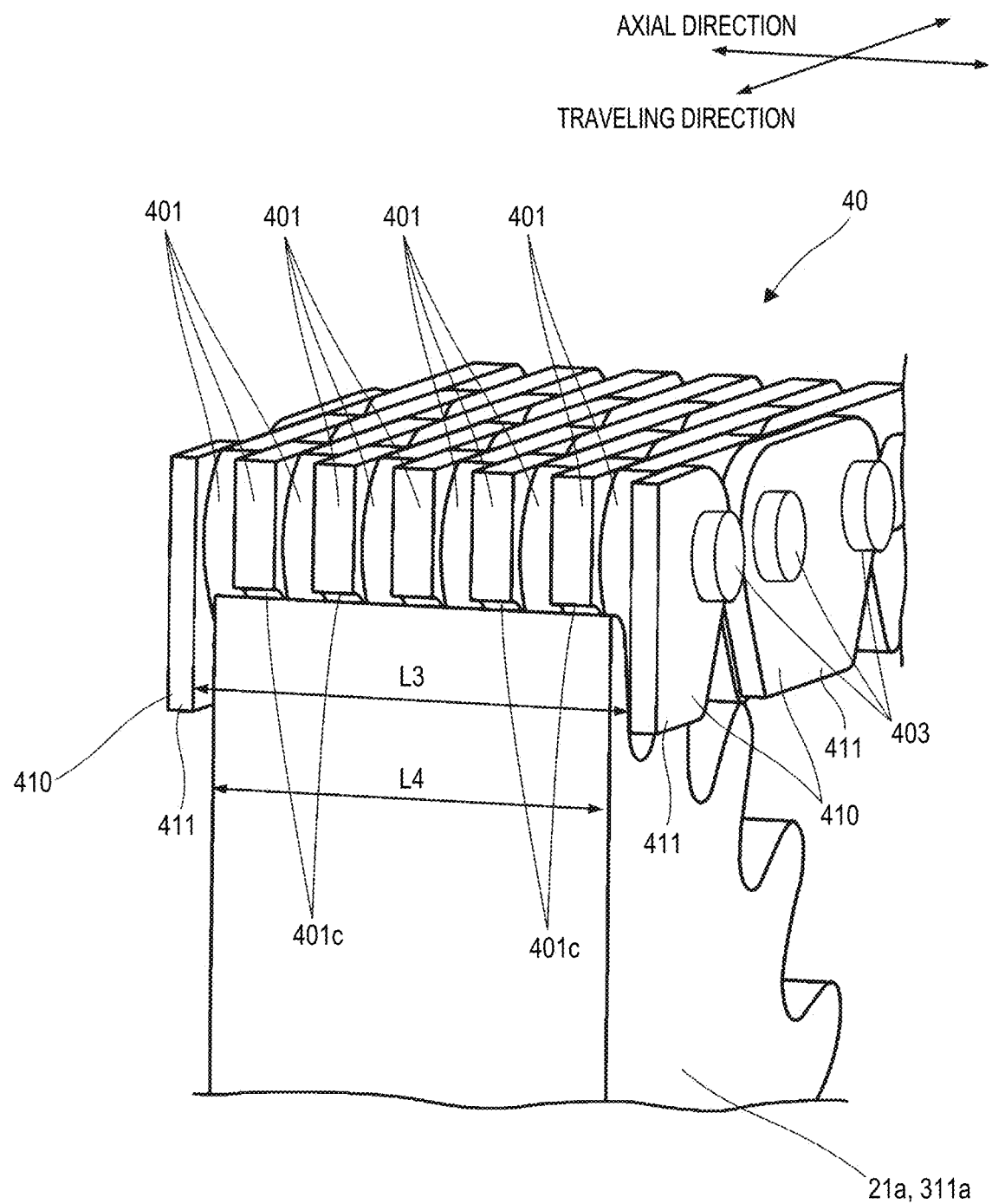
FIG. 7 is a cross-sectional perspective view of a chain transmission mechanism 4.

Here, as shown in FIG. 7, a distance L3 between the pair of left and right guide plates 410 is larger than an axial direction length L4 of the sprockets 21a and 311a. That is, the sprockets 21a and 311a and the power transmission chain 40 are relatively movable in the axial direction.

As described above, in the present embodiment, since the drive shaft 21 is allowed to move in the axial direction, it is not necessary to set positional accuracy of the drive shaft 21 and the input shaft 311 to be high. That is, a thrust load (axial direction load) is input to the driven sprocket 311a supported by the input shaft 311 when the sun gear 312 engages with the first planetary gear 314a of the stepped pinion 314. Meanwhile, the thrust load does not enter between the drive motor 20 and the drive sprocket 21a since there is no deceleration mechanism. Therefore, the drive shaft 21 can have a degree of freedom in the axial direction.

Utilizing such a fact, by supporting the drive shaft 21 in a manner that allows the drive shaft 21 to move in the axial direction, the guide plate 410 of the power transmission chain 40 abuts against an outer end surface of the sprocket 21a, and the sprocket 21a can move according to swinging of the power transmission chain 40, even when there is an axial direction positional variation of the driven sprocket 311a. In this way, in the drive unit 10, since the axial direction variation can be absorbed by movement of the drive shaft 21, it is not necessary to manage the drive shaft 21 and the input shaft 311 with high accuracy.

Next, a movable range of the drive shaft 21 (hereinafter, referred to as a movable range of the drive sprocket 21a) will be described with reference to FIG. 8.

Figure 8:
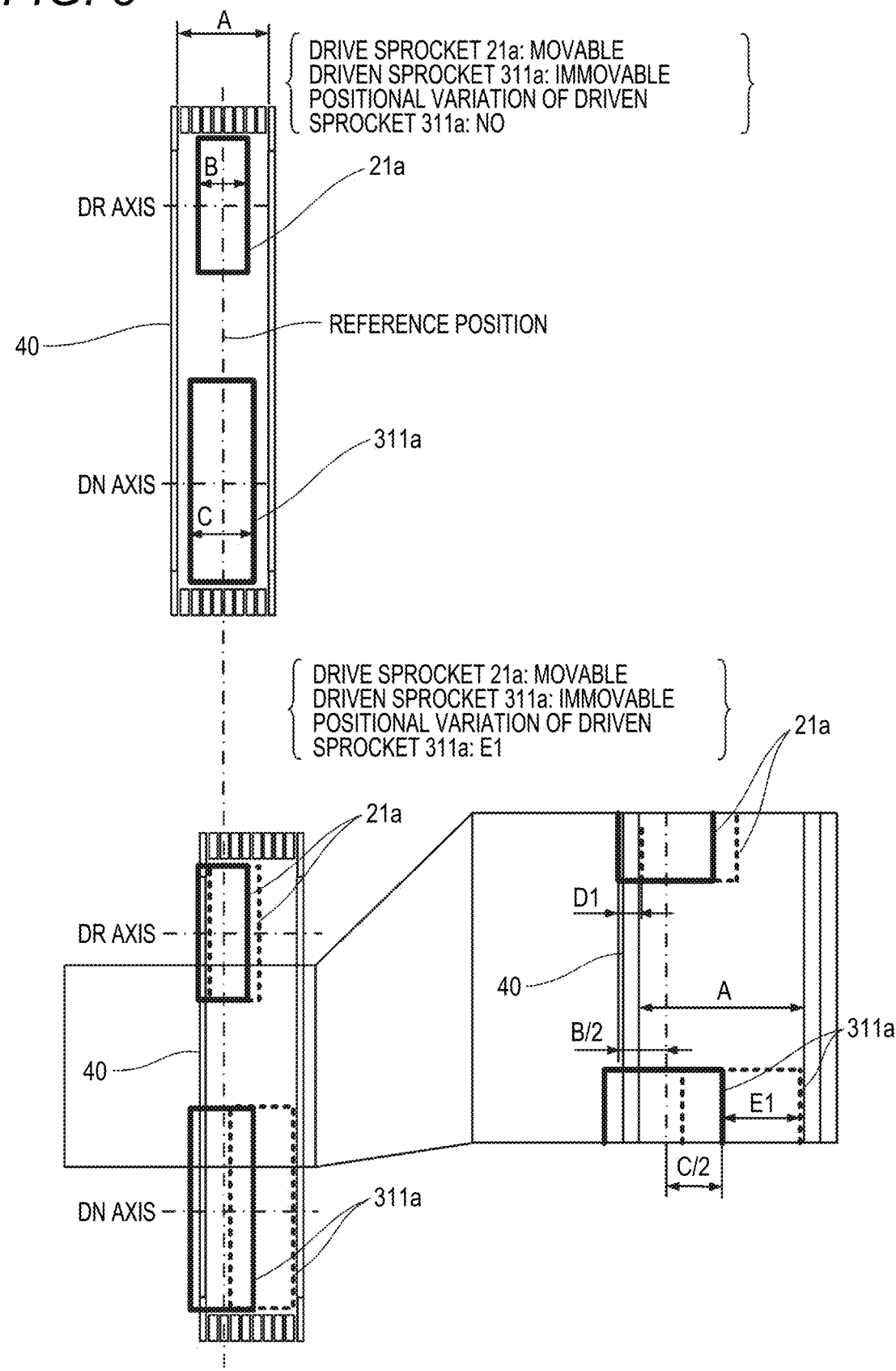
FIG. 8 is an explanatory diagram showing a movable range D of the drive shaft 21.

In FIG. 8, in the chain transmission mechanism 4 in which the drive sprocket 21a is movable in the axial direction and the driven sprocket 311a is not movable in the axial direction, an upper part of the drawing shows a positional relationship when there is no axial direction positional variation in the driven sprocket 311a, and a lower part of the drawing shows a positional relationship when there is an axial direction positional variation range in the driven sprocket 311a.

In FIG. 8, a DR axis indicates an axial center of the drive sprocket 21a (drive shaft 21), a DN axis indicates an axial center of the driven sprocket 311a (input shaft 311), and a reference position is a reference line passing through the axial direction center of the drive sprocket 21a and the axial direction center of the driven sprocket 311a when there is no axial direction positional variation in the driven sprocket 311a.

Assuming that an inner width of the power transmission chain 40 is A, a width of the drive sprocket 21a is B, a width of the driven sprocket 311a is C, the movable range of the drive sprocket 21a is D1, and the positional variation range of the driven sprocket 311a is E1, the movable range D of the drive sprocket 21a is expressed by the following formula (1) as shown in FIG. 8.

$$D1 = E1 + C/2 + B/2 - A \qquad (1)$$

That is, in the drive unit 10, the positional variation range E1 of the driven sprocket 311a can be allowed, and in this case, the drive sprocket 21a may be set to be movable within the movable range D1. In other words, if a support structure of the drive sprocket 21a (the drive shaft 21) has the movable range D1, a support structure of the driven sprocket 311a (the input shaft 311) is allowed to have the positional variation range E1.

Even when there is the positional variation range E1 of the driven sprocket 311a, the movable range D1 of the drive sprocket 21a for preventing the power transmission chain 40 and the drive sprocket 21a from interfering with each other in the axial direction is expressed by the following formula (2).

$$D1 > E1 + C/2 + B/2 - A \qquad (2)$$

By setting the movable range D1 of the drive sprocket 21a to satisfy the formula (2), it is possible to avoid contact between the power transmission chain 40 and the drive sprocket 21a.

In the above-described embodiment, the clip 25 is fixed to the outer peripheral surface of the drive shaft 21 through which the inner peripheral portion of the motor shaft 20a is inserted, the sliding groove 20b in which the clip 25 is slidable is provided in the inner peripheral portion of the motor shaft 20a, and the motor shaft 20a and the drive shaft 21 are relatively movable in the axial direction, but the configuration is not limited thereto. That is, the clip 25 may be fixed to an inner peripheral surface of the motor shaft 20a, the sliding groove in which the clip 25 is slidable may be provided in the outer peripheral surface of the drive shaft 21, and the motor shaft 20a and the drive shaft 21 may be relatively movable in the axial direction.

In the embodiment described above, the drive shaft 21 supporting the drive sprocket 21a is coupled to the motor shaft 20a in a manner that does not allow relative rotation and allows relative movement in the axial direction, and the rotation shaft 311b supporting the driven sprocket 311a is coupled to the input shaft 311 in a manner that does not allow relative rotation and does not allow relative movement in the axial direction. In other words, the drive sprocket 21a is movable in the axial direction, and the driven sprocket 311a is not movable. However, the configuration is not limited thereto, the drive shaft 21 supporting the drive sprocket 21a may be coupled to the motor shaft 20a in a manner that does not allow relative rotation and does not allow relative movement in the axial direction, and the rotation shaft 311b supporting the driven sprocket 311a may be coupled to the input shaft 311 in a manner that does not allow relative rotation and allows relative movement in the axial direction. In other words, the drive sprocket 21a may not be movable in the axial direction, and the driven sprocket 311a may be movable.

In this case, although not shown, assuming that the inner width of the power transmission chain 40 is A, the width of the drive sprocket 21a is B, the width of the driven sprocket 311a is C, a movable range of the driven sprocket 311a is D2, and a positional variation range of the drive sprocket 21a is E2, contact between the power transmission chain 40 and the driven sprocket 311a can be avoided by setting the movable range D2 of the driven sprocket 311a to satisfy the following formula (3).

$$D2 > E2 + C/2 + B/2 - A \quad (3)$$

In this case, the clip 25 may be fixed to an outer peripheral surface of the input shaft 311 through which an inner peripheral portion of the rotation shaft 311b is inserted, a sliding groove having a width larger than that of the clip 25 and allowing the clip 25 to slide therein may be provided in the inner peripheral portion of the rotation shaft 311b, and the rotation shaft 311b and the input shaft 311 may be relatively movable in the axial direction, or the clip 25 may be fixed to an inner peripheral surface of the rotation shaft 311b, a sliding groove having a width larger than that of the clip 25 and allowing the clip 25 to slide therein may be provided in the outer peripheral surface of the input shaft 311, and the rotation shaft 311b and the input shaft 311 may be movable relative to each other in the axial direction.

Further, the drive shaft 21 supporting the drive sprocket 21a may be coupled to the motor shaft 20a in a manner that does not allow relative rotation and allows relative movement in the axial direction, and the rotation shaft 311b supporting the driven sprocket 311a may be coupled to the input shaft 311 in a manner that does not allow relative rotation and allows relative movement in the axial direction. In other words, the drive sprocket 21a may be movable in the axial direction, and the driven sprocket 311a may be movable.

Although the embodiment of the present invention has been described above with reference to the accompanying drawings, it is needless to say that the present invention is not limited to the embodiment. It is apparent that those skilled in the art can conceive of various modifications and alterations within the scope described in the claims, and it is understood that such modifications and alterations naturally fall within the technical scope of the present invention. In addition, the constituent elements in the above embodiment may be freely combined without departing from the gist of the invention.

For example, the power transmission chain 40 is shown as an example of the endless flexible member, but the endless flexible member is not limited thereto, and may be a belt.

In this specification, at least the following matters are described. Although corresponding constituent elements or the like in the embodiment described above are shown in parentheses, the present invention is not limited thereto.

(1) A power transmission device (drive unit 10) including:
a first rotation member (drive sprocket 21a);
a first rotation shaft (drive shaft 21) supporting the first rotation member;
a second rotation member (driven sprocket 311a);
a second rotation shaft (rotation shaft 311b) supporting the second rotation member; and
an endless flexible member (power transmission chain 40) wound around the first rotation member and the second rotation member, in which
at least one of the first rotation member and the second rotation member is movable in an axial direction thereof, and
the endless flexible member includes a restriction portion (guide plate 410) configured to restrict movement of at least one of the first rotation member and the second rotation member in the axial direction.

According to (1), since the first rotation member and/or the second rotation member can be moved in the axial direction, an axial direction position of the first rotation member and/or the second rotation member naturally follows movement of the endless flexible member, and thus a manufacturing cost can be reduced without increasing accuracy of each component.

(2) The power transmission device according to (1), in which
the first rotation member is fixed to the first rotation shaft in a manner that does not allow rotation relative to the first rotation shaft and does not allow movement in the axial direction relative to the first rotation shaft, and
the second rotation member is fixed to the second rotation shaft in a manner that does not allow rotation relative to the second rotation shaft and does not allow movement in the axial direction relative to the second rotation shaft.

According to (2), since the rotation shaft and the rotation member are fixed in both the axial direction and a circumferential direction, it is possible to manage availability of movement in the axial direction by a supporting method of the rotation shaft.

(3) The power transmission device according to (1), in which
the first rotation shaft is coupled to an output part (motor shaft 20a) of a drive source in a manner that does not allow rotation relative to the output part and allows movement in the axial direction relative to the output part,
a clip (clip 25) is fixed to one of the first rotation shaft and the output part,
a sliding groove (sliding groove 20b) in which the clip is arranged to be slidable is provided in another one of the first rotation shaft and the output part, and
a width (width L2) of a slidable area defined by the first rotation shaft and the sliding groove is larger than a width (width L1) of the clip, whereby the first rotation shaft is movable in the axial direction relative to the output part.

According to (3), an amount of movement of the first rotation member in the axial direction can be managed by a relationship between the width of the clip and the width of the slidable area.

(4) The power transmission device according to (1), in which
the second rotation shaft is coupled to an input part (input shaft 311) of a driven unit in a manner that does not allow rotation relative to the input part and allows movement in the axial direction relative to the input part,
a clip (clip 25) is fixed to one of the second rotation shaft and the input part,
a sliding groove (sliding groove 20b) in which the clip is arranged to be slidable is provided in another one of the second rotation shaft and the input part, and
a width (width L2) of a slidable area defined by the second rotation shaft and the sliding groove is larger than a width (width L1) of the clip, whereby the second rotation shaft is movable in the axial direction relative to the input part.

According to (4), an amount of movement of the second rotation member in the axial direction can be managed by a relationship between the width of the clip and the width of the slidable area.

(5) The power transmission device according to (1), in which
the first rotation member is a drive sprocket,
the second rotation member is a driven sprocket, and
the endless flexible member is a chain.

According to (5), application to a chain transmission is enabled.

(6) The power transmission device according to (5), in which
the restriction portion of the endless flexible member includes guide plates disposed on both side surfaces of the chain.

According to (6), movement of the first rotation member and/or the second rotation member in the axial direction can be restricted by the guide plate disposed on each of the two side surfaces of the chain.

(7) The power transmission device according to (6), in which
when the drive sprocket is movable in the axial direction and the driven sprocket is not movable in the axial direction,
$D1>E1+(B+C)/2-A$ is satisfied, where
A is a width between inner surfaces of the guide plates of the chain,
B is a width of a tooth portion of the drive sprocket,
C is a width of a tooth portion of the driven sprocket,
D1 is a movable distance of the drive sprocket in the axial direction, and
E1 is a positional variation of the driven sprocket.

According to (7), it is possible to absorb the positional variation of the driven sprocket by an amount of movement of the drive sprocket in the axial direction.

(8) The power transmission device according to (6), in which
when the drive sprocket is not movable in the axial direction and the driven sprocket is movable in the axial direction,
$D2>E2+(B+C)/2-A$ is satisfied, where
A is a width between inner surfaces of the guide plates of the chain,
B is a width of a tooth portion of the drive sprocket,
C is a width of a tooth portion of the driven sprocket,
D2 is a movable range of the driven sprocket in the axial direction, and
E2 is a positional variation of the drive sprocket.

According to (8), it is possible to absorb the positional variation of the drive sprocket by an amount of movement of the driven sprocket in the axial direction.

(9) The power transmission device according to (6), in which
the guide plates include guide portions (guide portion 411) overlapping a tooth portion of the drive sprocket and a tooth portion of the driven sprocket when viewed in the axial direction.

According to (9), movement of the first rotation member and/or the second rotation member in the axial direction can be restricted by the guide portion of the guide plate.

What is claimed is:
1. A power transmission device comprising:
a first rotation member;
a first rotation shaft supporting the first rotation member;
a second rotation member;
a second rotation shaft supporting the second rotation member; and
an endless flexible member wound around the first rotation member and the second rotation member, wherein
at least one of the first rotation member and the second rotation member is movable in an axial direction thereof,
the endless flexible member includes a restriction portion configured to restrict movement of at least one of the first rotation member and the second rotation member in the axial direction,
the first rotation member is fixed to the first rotation shaft in a manner that does not allow rotation relative to the first rotation shaft and does not allow movement in the axial direction relative to the first rotation shaft, and
the second rotation member is fixed to the second rotation shaft in a manner that does not allow rotation relative to the second rotation shaft and does not allow movement in the axial direction relative to the second rotation shaft.

2. The power transmission device according to claim 1, wherein
the first rotation member is a drive sprocket,
the second rotation member is a driven sprocket, and
the endless flexible member is a chain.

3. The power transmission device according to claim 2, wherein
the restriction portion of the endless flexible member includes guide plates disposed on both side surfaces of the chain.

4. The power transmission device according to claim 3, wherein
when the drive sprocket is movable in the axial direction and the driven sprocket is not movable in the axial direction,
$D1>E1+(B+C)/2-A$ is satisfied, where
A is a width between inner surfaces of the guide plates of the chain,
B is a width of a tooth portion of the drive sprocket,
C is a width of a tooth portion of the driven sprocket,
D1 is a movable distance of the drive sprocket in the axial direction, and
E1 is a positional variation of the driven sprocket.

5. The power transmission device according to claim 3, wherein
when the drive sprocket is not movable in the axial direction and the driven sprocket is movable in the axial direction,
$D2>E2+(B+C)/2-A$ is satisfied, where
A is a width between inner surfaces of the guide plates of the chain,
B is a width of a tooth portion of the drive sprocket,
C is a width of a tooth portion of the driven sprocket,
D2 is a movable range of the driven sprocket in the axial direction, and
E2 is a positional variation of the drive sprocket.

6. The power transmission device according to claim 3, wherein
the guide plates include guide portions overlapping a tooth portion of the drive sprocket and a tooth portion of the driven sprocket when viewed in the axial direction.

7. A power transmission device comprising:
a first rotation member;
a first rotation shaft supporting the first rotation member;
a second rotation member;
a second rotation shaft supporting the second rotation member; and
an endless flexible member wound around the first rotation member and the second rotation member, wherein
at least one of the first rotation member and the second rotation member is movable in an axial direction thereof, the endless flexible member includes a restriction portion configured to restrict movement of at least one of the first rotation member and the second rotation member in the axial direction, the first rotation shaft is coupled to an output part of a drive source in a manner that does not allow rotation relative to the output part and allows movement in the axial direction relative to the output part, a clip is fixed to one of the first rotation shaft and the output part, a sliding groove in which the clip is arranged to be slidable is provided in another one of the first rotation shaft and the output part, and a width of a slidable area defined by the first rotation shaft and the sliding groove is larger than a width of the clip, whereby the first rotation shaft is movable in the axial direction relative to the output part.

8. A power transmission device comprising:

a first rotation member;

a first rotation shaft supporting the first rotation member;

a second rotation member;

a second rotation shaft supporting the second rotation member; and an endless flexible member wound around the first rotation member and the second rotation member, wherein at least one of the first rotation member and the second rotation member is movable in an axial direction thereof, the endless flexible member includes a restriction portion configured to restrict movement of at least one of the first rotation member and the second rotation member in the axial direction, the second rotation shaft is coupled to an input part of a driven unit in a manner that does not allow rotation relative to the input part and allows movement in the axial direction relative to the input part, a clip is fixed to one of the second rotation shaft and the input part, a sliding groove in which the clip is arranged to be slidable is provided in another one of the second rotation shaft and the input part, and a width of a slidable area defined by the second rotation shaft and the sliding groove is larger than a width of the clip, whereby the second rotation shaft is movable in the axial direction relative to the input part.

* * * * *